US012420442B2

(12) United States Patent
Katsikas

(10) Patent No.: US 12,420,442 B2
(45) Date of Patent: Sep. 23, 2025

(54) CUTTING MEMBERS WITH MULTIPLE CUTTING EDGES

(71) Applicant: Bic Violex S.A., Anoixi (GR)

(72) Inventor: Georgios Katsikas, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 687 days.

(21) Appl. No.: 17/652,414

(22) Filed: Feb. 24, 2022

(65) Prior Publication Data

US 2022/0266465 A1 Aug. 25, 2022

(30) Foreign Application Priority Data

Feb. 25, 2021 (EP) .................................... 21159362

(51) Int. Cl.
*B26B 21/40* (2006.01)
*B26B 21/22* (2006.01)
*B26B 21/56* (2006.01)

(52) U.S. Cl.
CPC ........ *B26B 21/4031* (2013.01); *B26B 21/227* (2013.01); *B26B 21/565* (2013.01); *B26B 21/4068* (2013.01)

(58) Field of Classification Search
None
See application file for complete search history.

(56) References Cited

U.S. PATENT DOCUMENTS

| | | | | |
|---|---|---|---|---|
| 1,877,149 A | 9/1932 | Sylvan | | |
| 2010/0154221 A1 | 6/2010 | Benedetto et al. | | |
| 2014/0026424 A1* | 1/2014 | Oglesby | B26B 21/4031 30/50 |
| 2017/0326744 A1* | 11/2017 | Liberatore | B26B 21/4012 |
| 2019/0061184 A1* | 2/2019 | Lin | B26B 21/22 |
| 2019/0168402 A1* | 6/2019 | Efthimiadis | B26B 21/565 |
| 2022/0266465 A1* | 8/2022 | Katsikas | B26B 21/227 |

FOREIGN PATENT DOCUMENTS

| | | | | |
|---|---|---|---|---|
| DE | 2544425 A1 | | 4/1976 | |
| EP | 0783396 B1 | | 9/2003 | |
| EP | 3446840 A2 | | 2/2019 | |
| EP | 3771533 A1 | * | 2/2021 | B26B 21/227 |
| EP | 4067025 A1 | * | 10/2022 | B26B 21/222 |
| JP | 2013099467 A | * | 5/2013 | |
| KR | 1020060097535 A | | 9/2006 | |
| WO | WO-2012158141 A1 | * | 11/2012 | B26B 21/227 |
| WO | WO-2018052802 A1 | * | 3/2018 | B26B 21/22 |
| WO | WO-2021113315 A1 | * | 6/2021 | B26B 21/24 |

OTHER PUBLICATIONS

European Search Report issued in European Application 21159362.9 on Aug. 16, 2021 (8 pages).

* cited by examiner

*Primary Examiner* — Hwei-Siu C Payer
(74) *Attorney, Agent, or Firm* — Bookoff McAndrews, PLLC

(57) ABSTRACT

A cutting member may include a base portion that couples the cutting member to a razor cartridge being formed of a single sheet of material or multiple fixedly connected sheets of material. The base portion may define two opposite broad surfaces and edges connecting the broad surfaces, a first cutting edge portion connected to one edge of the base portion and extending at an angle in a first direction, and a second cutting edge portion connected to the one edge of the base portion and extending at an angle in a second direction different from the first direction.

18 Claims, 5 Drawing Sheets

CUTTING MEMBERS WITH MULTIPLE CUTTING EDGES

CROSS REFERENCE TO RELATED APPLICATION

This patent application claims benefit to European Patent Application No. 21159362.9, filed on Feb. 25, 2021, its content being incorporated herein by reference.

TECHNICAL FIELD

The present disclosure relates to cutting members, razor cartridges, shaving razor assemblies and methods of manufacturing a razor cartridge.

BACKGROUND

Safety razors with multiple blades have been known for quite some time. However, there is an ongoing effort to improve the properties of safety razors with multiple blades. In particular, the reduction or prevention of nicks and cuts while at the same time providing a close shave and maintaining a sufficient level of rinsability (e.g., avoidance of hard to remove debris getting stuck in the cartridge between the blades) can be an issue. Some of the above-recited objects might result in conflicting design requirements. For instance, improving rinsability can mean increasing an inter-blade span (i.e., a distance between a first cutting edge and a subsequent cutting edge) to make room for the debris to be rinsed away. Avoiding nicks and cuts, on the other hand, can be reduced by a decreased inter-blade span to reduce the amount of skin bulge forming between two blades. Moreover, safety razors and their cartridges should be produced in a resource efficient manner.

SUMMARY

In a first general aspect, the present disclosure relates to a base portion configured to couple the cutting member to a razor cartridge being formed of a single sheet of material or multiple fixedly connected sheets of material, the base portion defining two opposite broad surfaces and edges connecting the broad surfaces, a first cutting edge portion connected to one edge of the base portion and extending at an angle in a first direction, and a second cutting edge portion connected to the one edge of the base portion and extending at an angle in a second direction different from the first direction.

In a second general aspect, the present disclosure relates to a razor cartridge including at least one cutting member according to the first general aspect.

The present disclosure also relates to shaving razors and kits of parts including one or more razor cartridges according to the second general aspect.

In a third general aspect, the present disclosure relates to method of manufacturing a razor cartridge according to the second general aspect.

Particular examples of the first to third general aspects can be implemented so as to realize one or more of the following advantages.

First, the cutting members of the present disclosure can provide for additional skin support to reduce skin bulge and, in turn, nicks and cuts. This can be accomplished by providing a first cutting edge portion extending in a first direction which can be used to shave in some situations and a second cutting edge portion extending in a second direction can support the skin. If the razor is moved in an opposite direction the roles of the first and second cutting edge portions can swap (i.e., the second cutting edge portion is used for shaving and the first cutting edge portion for skin support).

On the other hand, a room between two cutting edge portions facing each other (in an arrangement with two or more cutting edge members according to the present disclosure) can be large enough to secure a certain degree of rinsability as two cutting edge portions are supported on one (common) base portion. For instance, in a multiblade cartridge with four blades currently for base or support portions are provided which have to be supported in a housing of a cartridge. When using the cutting members of the present disclosure two (common) base or support portions (one for two cutting edge portions) can suffice.

Second, a shaving efficiency and performance can be improved as the cutting members of the present disclosure can be moved in two opposite directions (shaving directions) while shaving. This can be beneficial as two shaving operations can be performed with a single back and forth motion. It can also improve the shaving result to cover an area of skin in a first direction with a first stroke and an opposite direction with a second stroke (e.g., hair which is pushed down but not cut during the first stroke can be cut during the second stroke).

Third, the cutting members themselves and the cartridges can be manufactured in a more resource-efficient manner in some examples as only a single (common) base portion is employed for two cutting edge portions. Accordingly, only a single (common) base portion has to be supported with respective support elements of housing of a razor cartridge.

Certain terms are used in the following manner in the present disclosure:

The expression "connected to" is not limited to a direct connection between two objects (i.e., it is not required that the two objects abut). For instance, a first object and a second object can be indirectly connected through a third object (e.g., a cutting edge portion can be indirectly connected to an edge of the base portion through another component such as a blade mounting portion).

The expression "extending at an angle" relates to an angle which is smaller than 180° (e.g., smaller than) 160°. Moreover, the expression "extending at an angle" specifies that the first object extending at an angle and the second object from which the first object extends inscribe the angle (e.g., the base portion extends in a first vertical direction and the cutting edge portions and the base portion define an inscribed angle). The expression "extending at an angle" includes but does not require direct contact between the first object extending at an angle and the second object from which the first object extends.

A "sheet of material" is an elongated piece of material having an extension in a first direction (e.g., a thickness) which is (substantially) smaller (e.g., at least 10 times smaller or at least 50 times smaller) than each of the extensions in a second and third direction (all directions being mutually orthogonal). Thus, a "sheet of material" forms a first broad surface and a second, opposite broad surface. The term "sheet of material" relates to the geometry and not to a class of material (e.g., a "sheet of material" can include or consist of a metal or alloy or a plastic material). The term "sheet of material" can relate to a substantially planar form factor (having a thickness that is at least 10 times smaller or at least 50 times smaller than a length and a width). However, a "sheet of material" does not have to be perfectly flat and/or planar. In some examples, a sheet of material can include features such as protrusions, slots or holes in the broad surfaces of the sheet of material and/or at the edges.

The term "edge" refers to a boundary limiting an object (e.g., the base portion). This does not necessarily mean that there is a material boundary. For instance, the base portion can be directly connected to blade mounting portion (e.g., these elements can be formed from the same sheet of material) but nevertheless there can be an edge limiting the base portion.

The term "fixedly attached" relates to a permanent or non-detachable attachment. For instance, a weld connection or an adhesive can be used to fixedly attach two objects. Two objects connected by a screw connection or a clip connection or by friction/releasable pressing forces, on the other hand, are not "fixedly attached".

DETAILED DESCRIPTION

Figure 1A:
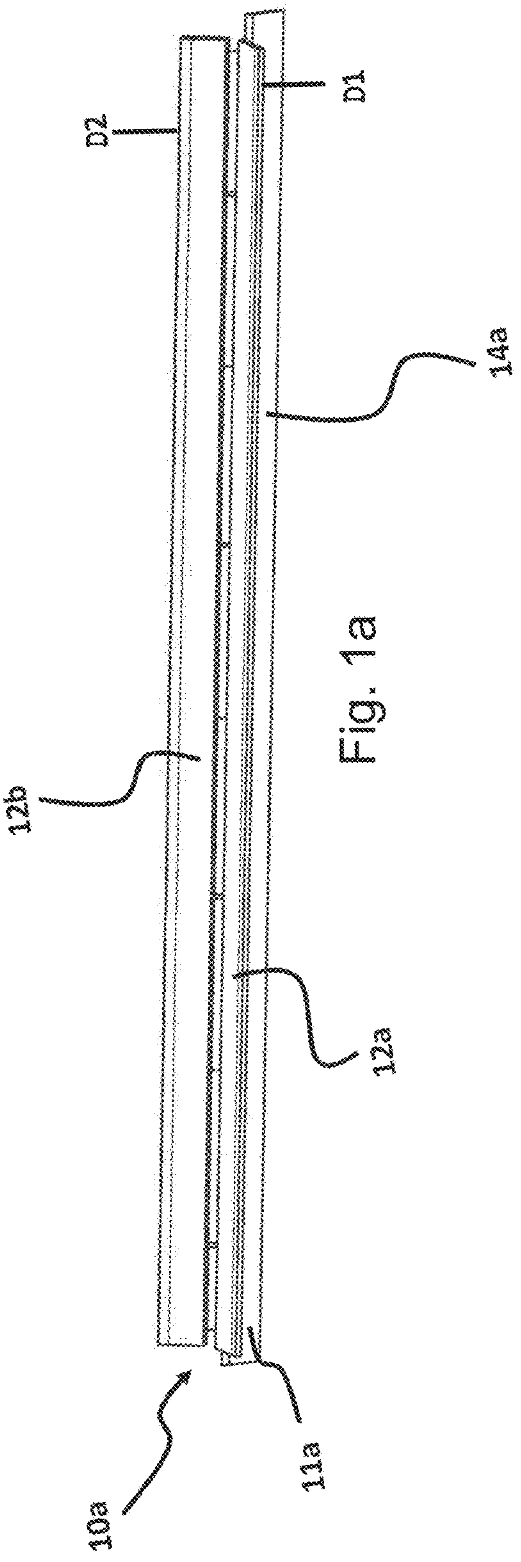
FIG. 1*a* illustrates a cutting member according to the present disclosure.
Figure 1B:
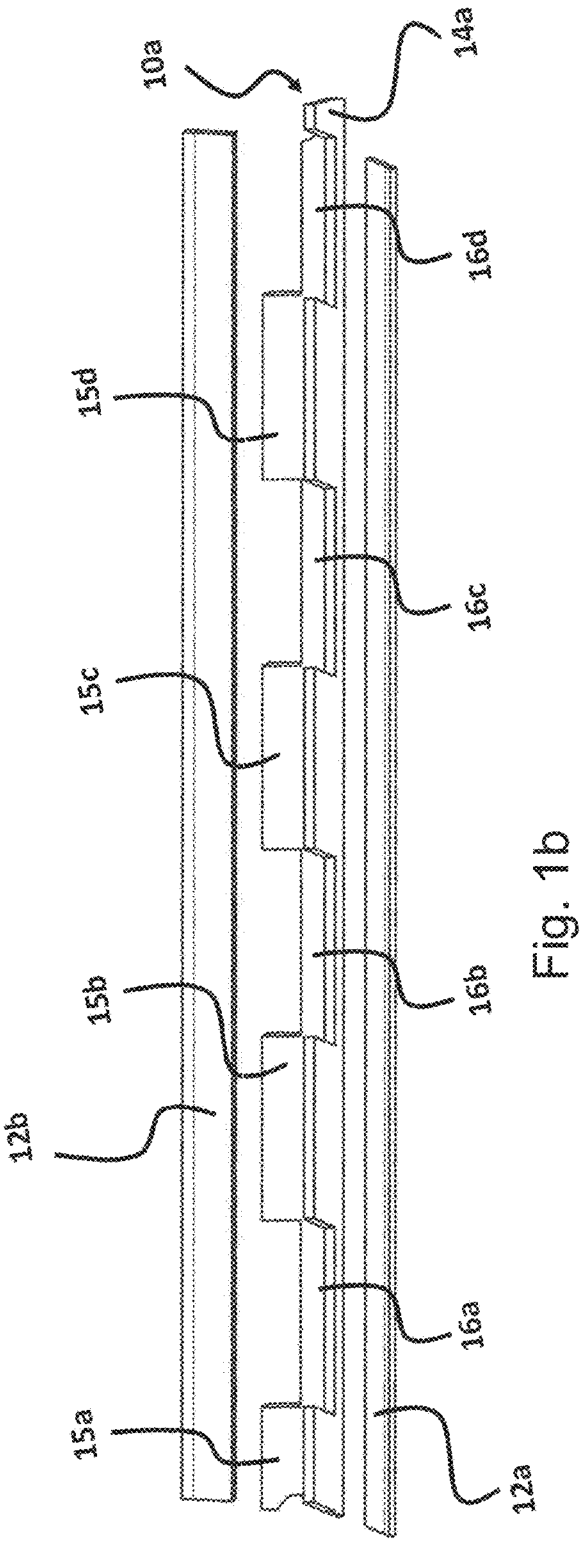
FIG. 1*b* shows an exploded view of the cutting member of FIG. 1*a*.

FIG. 1*a* illustrates a cutting member according to the present disclosure. FIG. 1*b* shows an exploded view of the cutting member of FIG. 1*a*.

As shown in FIG. 1*a*, a cutting member 10*a* comprises a base portion 14*a* configured to couple the cutting member 10*a* to a razor cartridge being formed of a single sheet of material.

The base portion can be formed of a single sheet of material as shown in FIG. 1*a*. In other examples (as discussed in more detail below), the base portion can be formed of multiple fixedly connected sheets of material.

The base portion 14*a* defines two opposing broad surfaces (only one broad surface 11*a* is visible in FIG. 1*a*) connected by edges of the base portion 14*a*. In general, the base portion can have an upper edge and an opposing lower edge delimiting the broad surfaces. Accordingly, the base portion can have two opposing lateral edges delimiting the broad surfaces. As discussed above, the edge can be "virtual", i.e., another element can directly abut the edge.

In general, the base portion can have a longitudinal extension (i.e., in parallel to a cutting edge) which is more than 5 times larger than a vertical extension (i.e., orthogonal to the longitudinal direction from an attachment area of cutting edge portions to an edge opposite to the attachment area of cutting edge portions). The longitudinal extension and the vertical extension define the broad surfaces of the base portion. In some examples, a longitudinal extension of the base portion can be more than 2 cm. In addition or alternatively, a vertical extension of the base portion can be between about 2 mm and 8 mm (e.g., between 2 mm and 8 mm). A thickness of the base portion (i.e., an extension orthogonal to the longitudinal direction and the vertical direction) can be at least 5 times smaller than the vertical extension. The thickness of the base portion can refer to a distance between the broad surfaces defined by the base portion and define a smaller extension of the edges (the larger extension being the longitudinal and vertical extensions, respectively). In addition or alternatively, a thickness can be less than about 1 mm (e.g., less than 1 mm). In one example, the base portion has a longitudinal extension of more than 2 cm, a vertical extension of from 2 mm to 6 mm and a thickness of less than 1 mm. The base portion can be curved in some examples.

The cutting member 10*a* further comprises a first cutting edge portion 12*a* connected to one edge of the base portion 14*a* and extending at an angle in a first direction (i.e., substantially towards the viewer in FIG. 1*a*). The one edge can be an edge extending along the longitudinal extension of the base portion 14*a* (i.e., an upper edge if the base portion is oriented so that the broad surfaces extend in vertical planes). The cutting member also comprises a second cutting edge portion 12*b* connected to the one edge the base portion 14*a* and extending at an angle in second direction (i.e., substantially away from the viewer in FIG. 1*a*). That is, the first and second cutting edge portion 12*a* are connected to the same edge of the base portion 14*a*. In general, a cutting edge portion refers to a portion including a cutting edge (i.e., a sharpened tip of the cutting edge portion) but can also extend beyond the cutting edge proper. A cutting edge portion can be formed of a single piece of material or of multiple pieces of material (which can be fixedly connected, e.g., by welding).

The first direction and the second direction can have at least an anti-parallel component. In other words, the first and second directions point in different directions.

The direction of extension of the cutting edge portions in general relates to a direction pointing from an attachment area of the cutting edge portion towards the cutting edge (i.e., a sharpened tip of the cutting edge portion) of the cutting edge portion. The directions of extension for the cutting edge portions 12*a*, 12*b* are indicated by broken arrows in FIG. 2. These directions have an anti-parallel component as long as they are not parallel. In some examples the directions are strictly anti-parallel. In some examples, the first direction and the second direction inscribe an angle of between about 180° (e.g., 180°, i.e., the directions are anti-parallel) and about 60° (e.g., 60°). In other words, the first cutting edge portion 12*a* and the second cutting edge portion 12*b* can extend on different sides of a plane including the base portion 14*a* (basically including the broad surfaces of the base portion).

The base portion 14*a* can form a common support for both the first cutting edge portion 12*a* and the second cutting edge portion 12*b*.

In the examples of FIG. 1*a*, the cutting member 10*a* includes a blade support comprising the base portion 14*a*, a first blade mounting portion and a second blade mounting portion. The first cutting edge portion 12*a* is attached to the first blade mounting portion and the second cutting edge portion 12*b* is attached to the second blade mounting portion (i.e., the blade mounting portions indirectly connect the cutting edge portion to an edge of the base portion). The first blade mounting portion can extend form the base portion 14*a* (an edge of the base portion) in the first direction. The second blade mounting portion can extend form the base portion 14*a* (the edge of the base portion) in the second direction.

As can be seen in FIG. 1*b*, each blade mounting portion can comprise one or more protruding tabs 15*a-d* and 16*a-d* extending in the same direction from the base portion 14*a*

(an edge of the base portion) of the cutting member 10*a* for receiving a respective cutting edge portion 12*a*, 12*b*. In some examples, the first blade mounting portion includes a first set of one or more protruding tabs 15*a-d* and the second blade mounting portion includes a second set of one or more protruding tabs 16*a-d*.

The protruding tabs 15*a-d*, 16*a-d* of the blade mounting portions of a cutting member 10*a* can be arranged in an alternating manner along a longitudinal extension of the base portion 14*a*. In the other words, when moving along the longitudinal extension of the base portion 14*a*, areas where a protruding tab of the first set of one or more protruding tabs 15*a-d* extends from the base portion 14*a* follow areas where a protruding tab of the second set of one or more protruding tabs 15*a-d* extends from the base portion 14*a*.

In the example of FIG. 1*b*, there are four protruding tabs 15*a-d* and 16*a-d* forming each the first and second blade mounting portion. However, in other examples there can be a different number of protruding tabs. In some examples, the first and/or the second blade mounting portion includes only one tab. In other examples (or additionally), the first and/or the second blade mounting portion comprises two or more protruding tabs extending in the same direction from the base portion (e.g., both the first and the second blade mounting portions comprise two or more protruding tabs extending in the same direction from the base portion). The tabs can also be differently shaped than the tabs of FIG. 1*b*, as long as they are suitable to support a cutting edge portion.

The blade support comprising the base portion 14*a*, the first blade mounting portion and the second blade mounting portion can be formed from a single piece of material (e.g., a sheet of metal). In some examples, the first blade mounting portion and the second blade mounting portion are formed by dicing or cutting and bending a sheet of material (e.g., a sheet of metal) in different directions (e.g., to from the protruding tabs 15*a-d* and 16*a-d*).

The cutting edge portions 12*a*, 12*b* can be attached to the first and second blade mounting portions (e.g., the protruding tabs 15*a-d* and 16*a-d*) by any suitable technique. In some examples, the first and second cutting edge portions 12*a*, 12*b* are welded to the respective blade mounting portions. In other examples, the first and second cutting edge portions 12*a*, 12*b* are attached to the respective blade mounting portions by an adhesive or by soldering.

Forming a blade support comprising the base portion 14*a* from a single piece of material can reduce the number of resources required to manufacture a cutting member in some examples. Instead of two separate blade supports each carrying a cutting edge portion a single element can carry two cutting edge portions. This can also reduce the complexity of a cartridge to which the cutting member is attached as only a single blade support must be supported in some examples.

In the example of FIGS. 1*a* and 1*b*, the first cutting edge portion 12*a* and the second cutting edge portion 12*a* are attached to a respective outer surface of the respective blade mounting portion that, in use, faces the shaving plane. In other words, each blade mounting portion has an outer surface (visible in FIG. 1*b*) which is oriented towards a shaving plane when in use (i.e., which would be visible when looking at a razor cartridge including the cutting members when the respective cutting edge portions where removed). This outer surface can carry the respective cutting edge portion.

In other examples, the first cutting edge portion and/or the second cutting edge portion is attached to a respective inner surface of the respective blade mounting portion that, in use, faces away from the shaving plane. In other words, each blade mounting portion has an inner surface (not visible in FIG. 1*b*) which is oriented away from a shaving plane when in use (i.e., which would not visible when looking at a razor cartridge including the cutting members when the respective cutting edge portions where removed). This inner surface can carry the respective cutting edge portion.

Figure 2:
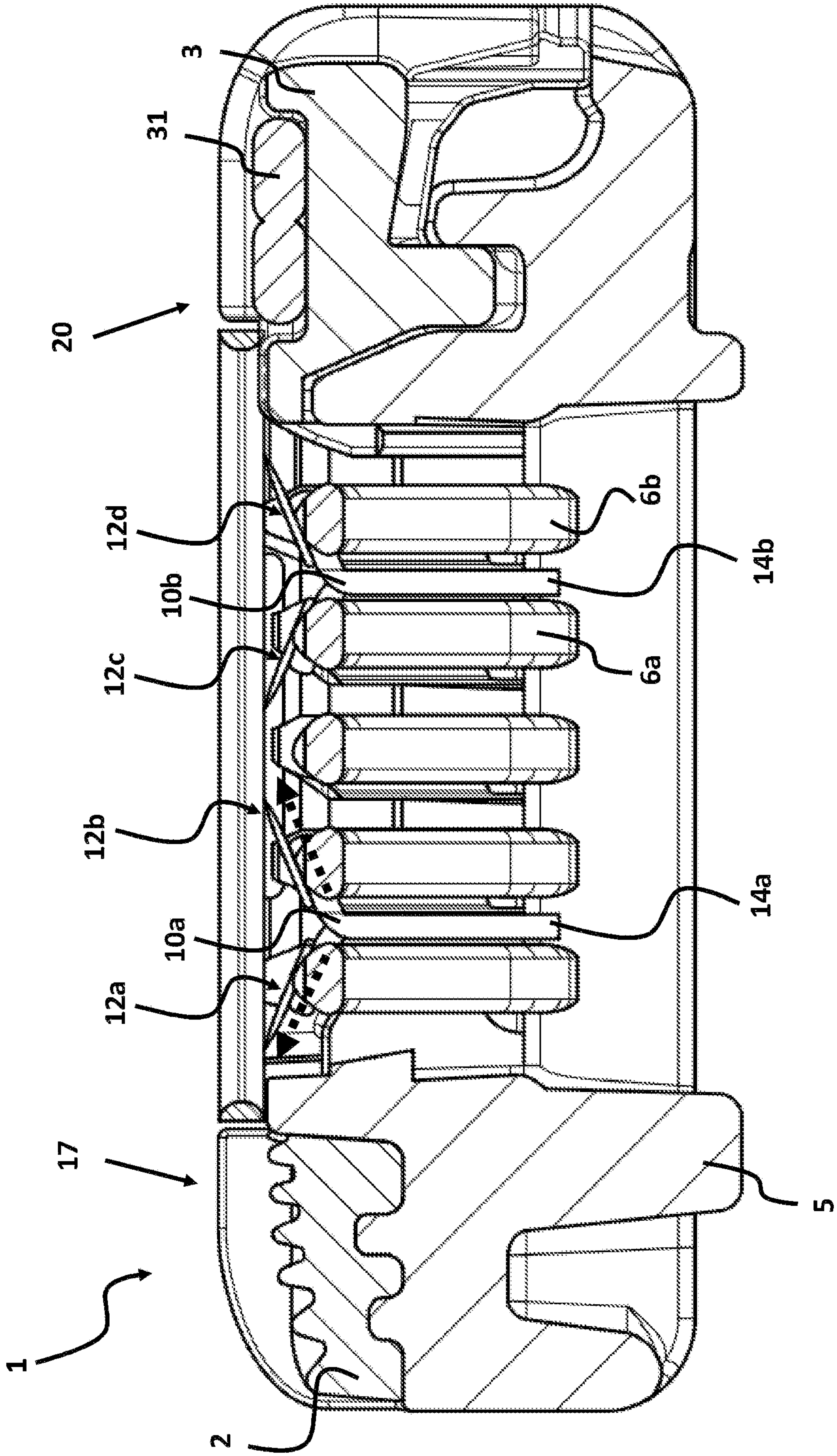
FIG. 2 shows a cross-section of a razor cartridge according to the present disclosure.
Figure 3:
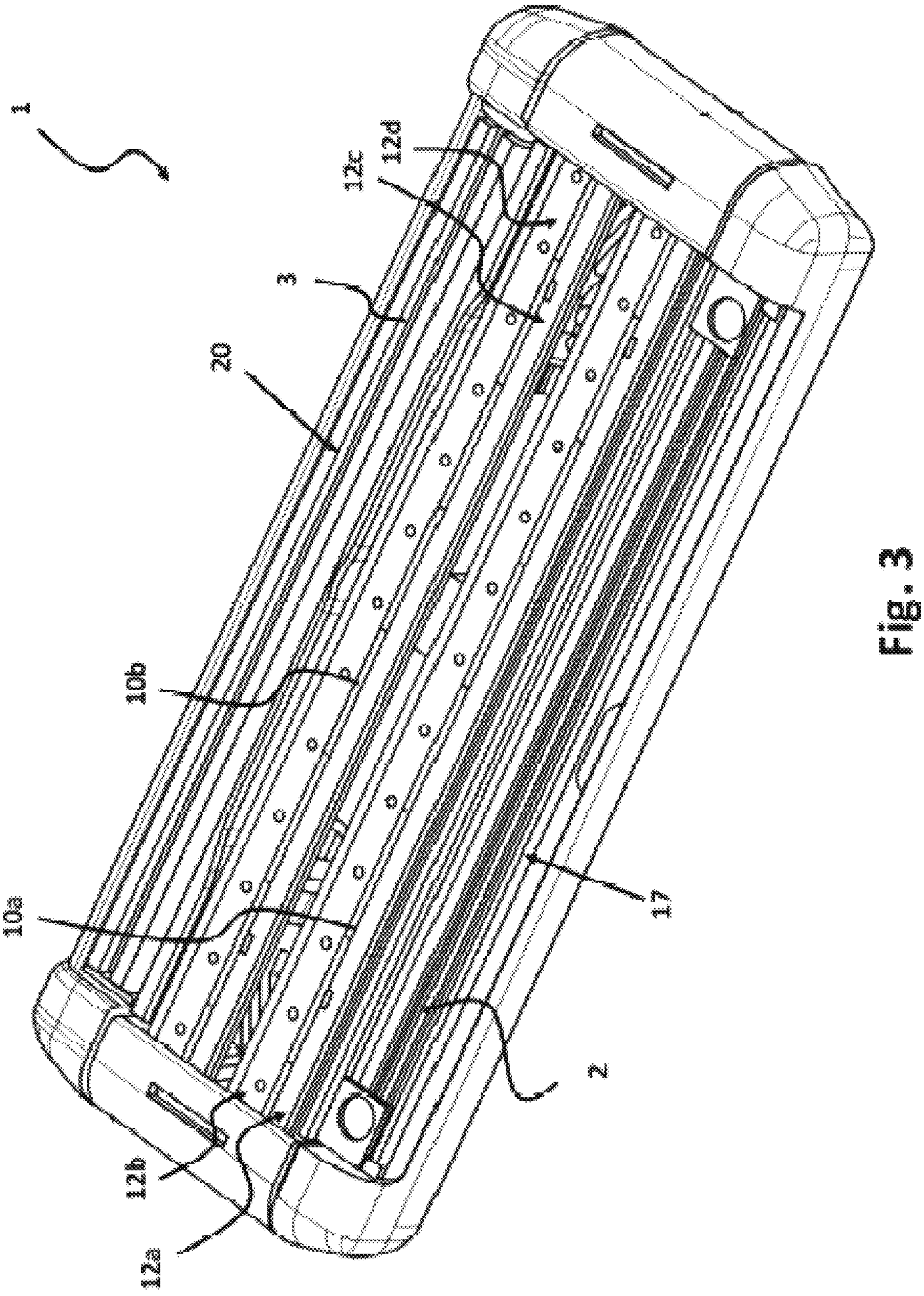
FIG. 3 shows a perspective view of the razor cartridge of FIG. 2.

FIG. 2 shows a cross-section of a razor cartridge 1 according to the present disclosure. FIG. 3 shows a perspective view of the razor cartridge of FIG. 2.

In some examples, the razor cartridge 1 includes a razor cartridge housing 5 and one or more cutting members 10*a*, 10*b* as described in the present disclosure arranged between a first longitudinal side 17 and a second longitudinal side 20 of the razor cartridge housing. The first cutting edge portion 12*a*, 12*c* of each of the cutting members 10*a*, 10*b* is oriented towards the first longitudinal side 17 and the second cutting edge portion 12*b*, 12*d* of each of the cutting members 10*a*, 10*b* is oriented towards the second longitudinal side 20. As can be seen in FIG. 2, the expression "is oriented towards" does not require that the cutting edge portions directly point towards the respective longitudinal side of the razor cartridge (but also include point to an area above or below the respective longitudinal side of the razor cartridge).

In the example of FIG. 2, the razor cartridge 1 includes two cutting members 10*a*, 10*b*. In other examples, a razor cartridge can only include a single cutting member as described in the present disclosure. In still other examples, a razor cartridge can include two or more cutting members as described in the present disclosure (e.g., three cutting members or four cutting members). In some examples, a razor cartridge includes only cutting members as described in the present disclosure (e.g., excluding one or more trimmer blades). In other examples, the razor cartridge also includes cutting members not configured as described in the present disclosure (e.g., "conventional" cutting members having a single cutting edge).

In the example of FIG. 2, the razor cartridge includes a skin guard 2 arranged at the first longitudinal side 17 and a cap element 3 (e.g., including a lubricating strip 31 or other skin care element) arranged at the second longitudinal side 20. This arrangement corresponds to a razor cartridge which is designed to be moved so that the first longitudinal side 17 comes into contact with an area of skin to be treated first (i.e., a shaving direction points towards the left side in FIG. 2). The razor cartridges including the cutting members of the present disclosure can be operated in two shaving directions in some examples. When moving the razor cartridge in a first shaving direction, the first cutting edge portions 12*a*, 12*c* of each of the cutting members 10*a*, 10*b* of the razor cartridge can shave an area to be treated. When moving the razor cartridge in a second shaving direction (e.g., opposite to the first shaving direction), the second cutting edge portions 12*b*, 12*d* of each of the cutting members 10*a*, 10*b* of the razor cartridge can shave an area to be treated. When operating in either shaving direction, the respective cutting edge portions not taking part in the shaving operation (or the outer surfaces of the respective blade mounting portions if the cutting edge portions are attached to an inner surface as described below) can support the skin (and prevent or reduce the formation of skin bulges in some examples). In this manner, the cutting members of the present disclosure can allow for multiple shaving directions and improve the shaving performance in some examples.

Returning to FIG. 2, a razor cartridge can also be arranged differently. For instance, in view of two possible shaving directions other elements than a skin guard 2 and a cap 3 can be arranged at the first and second longitudinal sides 17, 20 of the razor cartridge 1. For example, both the first and second longitudinal sides 17, 20 could include a skin guard (e.g., to prepare the skin to be treated for the imminent shaving operation, e.g., by erecting the hair) and/or a cap element configured to treat the skin after a shaving operation. In some examples the razor cartridge does not have a preferred shaving direction (but is configured substantially symmetrical with respect to the skin contacting elements).

In the example of FIG. 2, the base portions 14*a*, 14*b* of the cutting members 10*a*, 10*b* are movably arranged within the razor cartridge housing 5 in a direction orthogonal to a shaving plane defined by a skin-contacting side of the razor cartridge housing (i.e., the base portions 14*a*, 14*b* can move in a vertical direction as described above). The razor cartridge provides respective seat portions 6*a*, 6*b* for attaching the base portions 14*a*, 14*b*. The seat portions 6*a*, 6*b* can include elastic elements (e.g., leaf springs—not shown in FIG. 2) to allow the movement of the cutting members 10*a*, 10*b*.

In other examples, the base portions 14*a*, 14*b* of the cutting members 10*a*, 10*b* are rigidly connected to the razor cartridge housing 5 (i.e., the base portions 14*a*, 14*b* cannot move relative to the razor cartridge housing 5).

Figure 4B:
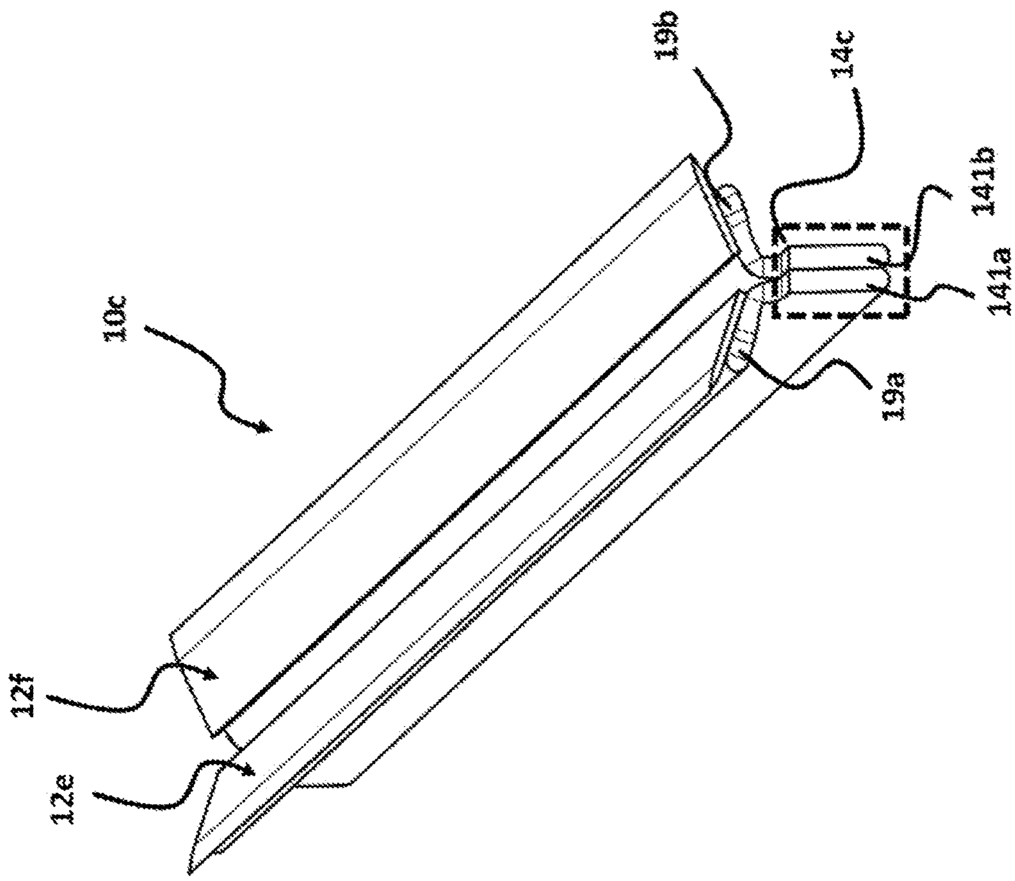
FIG. 4*a* and FIG. 4*b* illustrate further examples of the cutting edge members of the present disclosure.
Figure 4A:
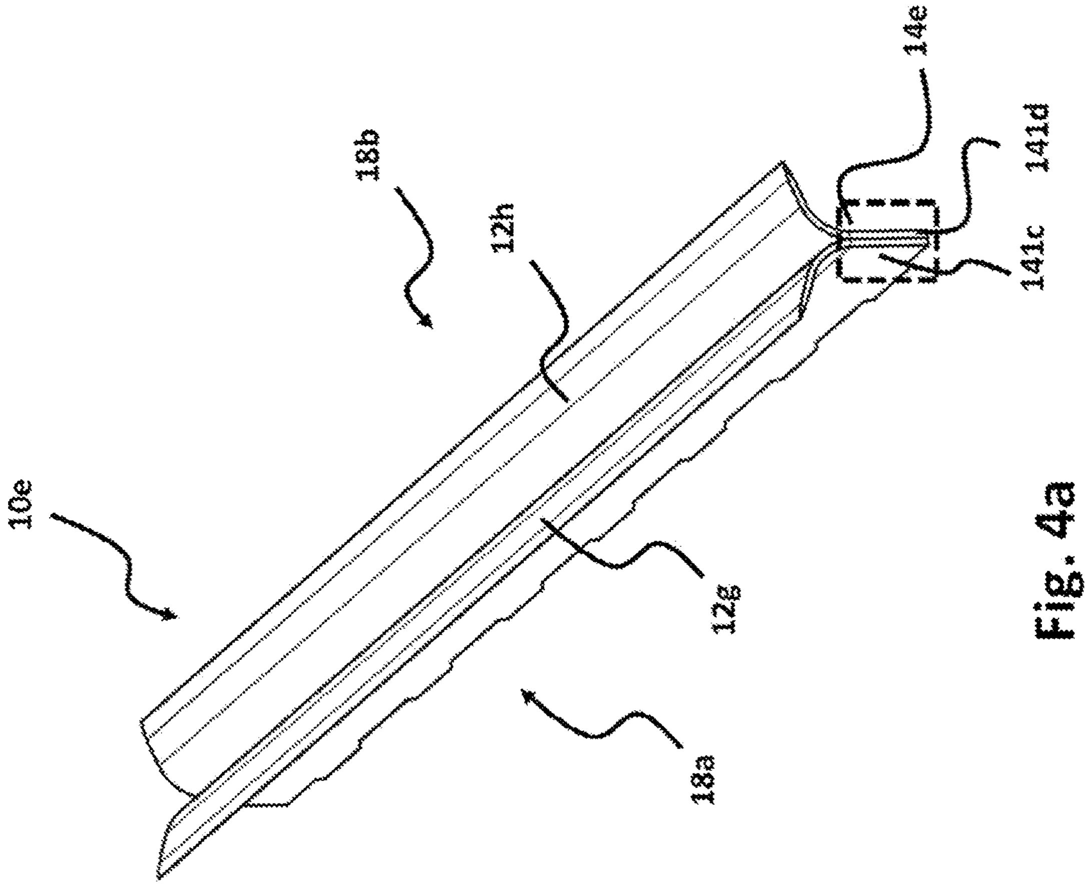

FIG. 4*a* and FIG. 4*b* illustrate further examples of the cutting edge members 10*c*, 10*e* of the present disclosure.

In some examples, as shown in FIG. 4*b*, the cutting member 10*c* comprises a first blade support and a second blade support, each blade support comprising a body portion 141*a*, 141*b* and a blade mounting portion 19*a*, 19*b*. A first cutting edge portion 12*e* is attached to the blade mounting portion of the first blade support and a second cutting edge portion 12*f* is attached to the blade mounting portion of the second blade support. The body portions of the first and the second blade supports are attached to one another such that the first cutting edge portion and the second cutting edge portion are oriented away from one another. The attached body portions 141*a*, 141*b* form a base portion 14*c* of the cutting member 10*c* as described herein having two broad surfaces connected at inner portions of the broad surfaces. The first and second cutting edge portions 12*e*, 12*f* are (indirectly) connected to an edge of the base portion 14*c* (by the blade mounting portion 19*a*, 19*b*). The base portion 14*c* of the cutting member 10*c* is formed of two sheets of material which are fixedly attached. The base portion 14*c* can have the extensions discussed above in connection with FIG. 1*a* (i.e., the fixedly attached sheets can be equated with the single sheet of FIG. 1*a*). As can be seen, the (multi-partite) base portion 14*c* forms a common support for the two cutting edge portions 12*e*, 12*f*.

In detail, the first blade support includes the first body portion 141*a* and the first blade mounting portion 19*a* for attaching the first cutting edge portion 12*e*. The second blade support includes the second body portion 141*b* and the second blade mounting portion 19*b* for attaching the second cutting edge portion 12*f*.

Even though the cutting member 10*c* includes a base portion 14*c* formed of multiple elements (sheets of material), the base portion 14*c* can still be considered to be a single support (and, e.g., attached to a razor cartridge in a single seat). Moreover, the first blade support and the second blade support of FIG. 4*b* can be identical. For instance, two identical blade supports can be attached in a back-to-back manner. This can simplify production in some examples as no special blade supports might be required for a cutting member including two cutting edges according to the present disclosure (and the blade supports of "conventional" cutting members can be used in some examples, or at least with only minor modifications).

The blade supports can be attached to form the base portion 14*c* by any suitable technique. In some examples, the blade supports are combined by welding. In other examples, the blade supports are combined by an adhesive or by soldering. In some examples, additional elements can be arranged between the blade supports in a fixedly connected manner.

The blade mounting portions 19*a*, 19*b* of the cutting member of FIG. 4*b* can each be a single planar element extending along the longitudinal extension of the base portion 14*c* (and being directly connected to an edge of the base portion 14*c*). In the example of FIG. 4*b*, the cutting edge portions 12*e*, 12*f* are attached to outer surfaces of the blade mounting portions 19*a*, 19*b* which in use, face towards the shaving plane. In other examples, the cutting edge portions can be attached to inner surfaces of the blade mounting portions which in use, face away from the shaving plane (in this respect, the teachings discussed above in connection with FIG. 1*a* are also applicable to the cutting member of FIG. 4*b*).

FIG. 4*a* shows a further example of a cutting member 10*e* comprising a first bent blade 18*a* and a second bent blade 18*b*. Each bent blade 18*a*, 18*b* comprises a body portion 141*c*, 141*d* and a cutting edge portion 12*g*, 12*h*. The body portions 141*c*, 141*d* of the first and the second bent blades 18*a*, 18*b* are attached to one another to form the base portion 14*e* of the cutting member 10*e* having two broad surfaces connected by edges. The first and second cutting edge portions 12*g*, 12*h* are (directly) connected to an edge of the base portion 14*e*. The cutting edge portion 12*g* of the first bent blade 18*a* and the cutting edge portion 12*h* of the second bent blade 18*b* are oriented away from each other. In the example of FIG. 4*a* each bent blade 18*a*, 18*b* can include one cutting edge portion 12*g*, 12*h* of the cutting member 10*e* and a part of the base portion 14*e* in an integral manner. For instance, the bent blades 18*a*, 18*b* can be bent from a single sheet of material (e.g., a sheet of metal). As in the example of FIG. 4*b*, the base portion 14*e* of the cutting member 10*e* is formed of two sheets of material which are fixedly attached. The base portion 14*e* can have the extensions discussed above in connection with FIG. 1*a* (i.e., the fixedly attached sheets can be equated with the single sheet of FIG. 1*a*). As can be seen, the (multi-partite) base portion 14*e* forms a common support for the two cutting edge portions 12*g*, 12*h*, which, however, extends as an integral part from the body portions 141*c*, 141*d*.

The blade supports can be attached to form the base portion 14*c* by any suitable technique. In some examples, the blade supports are combined by welding. In other examples, the blade supports are combined by an adhesive or by soldering. In some examples, additional elements can be arranged between the blade supports in a fixedly connected manner.

In some examples, a cutting member can include one bent blade as shown in FIG. 4*a* and one multipartite blade as shown in FIG. 4*b* which are fixedly attached to each other.

Figure 5:
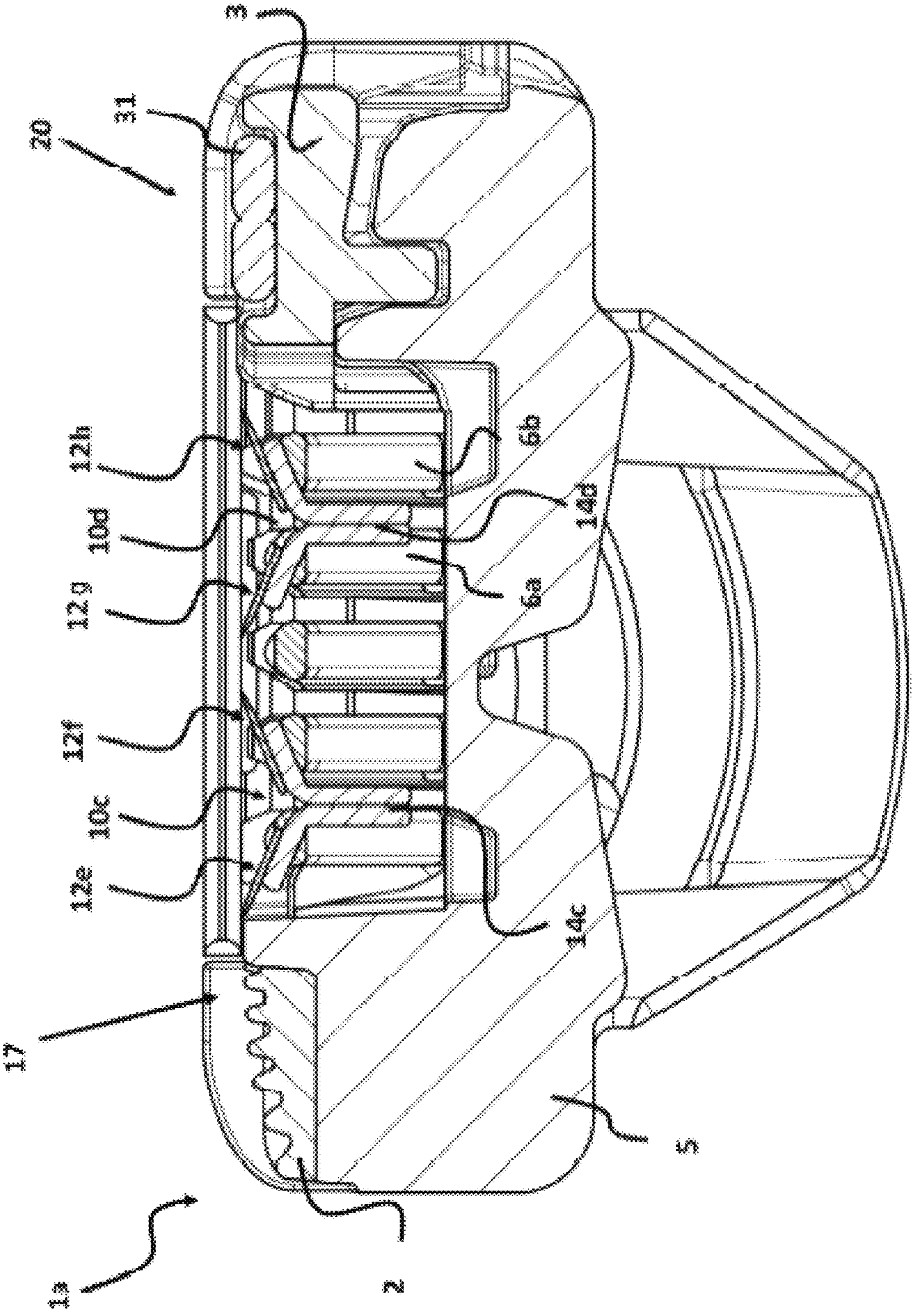
FIG. 5 shows a cross-section of another razor cartridge according to the present disclosure.

FIG. 5 shows a cross-section of another razor cartridge 1*a* according to the present disclosure. The razor cartridge 1*a* of FIG. 5 shares several features with the razor cartridge 1 of FIGS. 2 and 3. The corresponding features/elements have the same reference numerals as in FIGS. 2 and 3. The aspects and variants of these features/elements described above can equally be applied in the razor cartridge 1*a* of FIG. 5.

As can be seen, the razor cartridge 1*a* of FIG. 5 includes two cutting members 10*c*, 10*d* as described in connection with FIG. 4*a* above. The two cutting members 10*c*, 10*d* are arranged between a first longitudinal side 17 and a second longitudinal side 20 of a razor cartridge housing 5. The first cutting edge portion 12*e*, 12*g* of each of the cutting members 10*c*, 10*d* is oriented towards the first longitudinal side 17 and the second cutting edge portion 12*f*, 12*h* of each of the cutting members 10*c*, 10*d* is oriented towards the second longitudinal side 20. As can be seen in FIG. 5, the expression "is oriented towards" does not require that the cutting edge portions directly point towards the respective longitudinal side of the razor cartridge (but also include point to an area above or below the respective longitudinal side of the razor cartridge).

In the example of FIG. 5, the razor cartridge 1*a* includes two cutting members 10*c*, 10*d*. In other examples, a razor cartridge can only include a single cutting member as described in connection with FIG. 4*a*. In still other examples, a razor cartridge can include two or more cutting members as described in connection with FIG. 4*a* (e.g., three cutting members or four cutting members). In some examples, a razor cartridge includes only cutting members as described in connection with FIG. 4*a* (e.g., excluding one or more trimmer blades). In other examples, the razor cartridge also includes cutting members not configured as described in connection with FIG. 4*a* (e.g., "conventional" cutting members having a single cutting edge).

In some examples, a razor cartridge can include two or more different types of cutting members as described in the present disclosure (e.g., at least one cutting member as described in connection with FIG. 1*a*, FIG. 4*a* and FIG. 4*b* and at least one cutting member as described in a different one of FIG. 1*a*, FIG. 4*a* and FIG. 4*b*).

In the following sections we will describe several further aspects the cutting members and razor cartridges of the present disclosure of some examples.

In some examples, the cutting member of the present disclosure has a Y-shaped form (see, e.g., FIG. 1*a*, FIG. 4*a* and FIG. 4*b*) A stem of the Y can form the base portion of the cutting member of the present disclosure and each branch of the of the Y can form one cutting edge portion of the cutting member of the present disclosure. A T-shape is seen as one (extreme) example of a Y-shape according to the present disclosure in which the cutting edge portions extend in antiparallel directions. As can be seen, the Y-shaped form can describe a cutting member including multiple components which are fixedly attached (e.g., by welding).

In some examples, the first cutting edge portion and the base portion define a first internal angle, and the second cutting edge and the base portion define a second internal angle. An internal angel can be seen as the smaller angle formed by two objects where the first object extends at an angle from the second object. An opposite angle of the internal angle is thus the larger angle formed by the formed by two objects where the first object extends at an angle from the second object.

In some examples, a value of the first internal angle can range from about 90° (e.g., 90°) to lower than 180° and a value of the second internal angle ranges from about 90° (e.g., 90°) to lower than 180°. For instance, the value of the first internal angle can range from about 90° to about 135° (e.g., from 90° to 135°) and the value of the second internal angle can range from about 90° to about 135° (e.g., from 90° to 135°). In still other examples, the value of the first internal angle can range from about 105° to about 130° (e.g., from 105° to 130°) and the value of the second internal angle can range from about 105° to about 130° (e.g., from 105° to 130°).

The values of the first internal angle and the second internal angle can be equal in some examples. The values of the first internal angle and the second internal angle cam be different in some examples.

As discussed above, the first cutting edge portion and the second cutting edge portion each comprise a respective cutting edge. In some examples, two or more cutting members of a razor cartridge can be disposed to define inter-blade spans between first cutting edges of the first cutting edge portions, and between second cutting edges of the second cutting edge portions. A first dimension of the cutting member corresponds to an orthogonal projection of the length of the first cutting edge portion on the shaving plane and a second dimension of the cutting member corresponds to an orthogonal projection of the length of the second cutting edge portion on the shaving plane. The spans at least comprise the longest of the first dimension or the second dimension such that the cutting edge portions facing each other do not overlap. In some examples, the first dimension and the second dimension can be equal. In other examples, the first dimension and the second dimension can be different.

The present disclosure also relates to a shaving razor assembly including a razor handle and a razor cartridge as described in the present disclosure. The razor cartridge can be releasably attached to the razor handle, e.g., via a pivotable connection. In other examples, the razor cartridge can be releasably attached to the razor handle via a non-pivotable connection. Ins still other examples, the razor cartridge integrally formed with the razor handle including a pivotable connection. In still other examples, the razor cartridge integrally formed with the razor handle including a non-pivotable connection.

The present disclosure also relates to a kit of parts including a razor handle and a razor cartridge holder comprising a plurality of razor cartridges as described in the present disclosure.

The present disclosure also relates to a kit of parts including a razor cartridge holder and a plurality of razor cartridges as described in the present disclosure.

The present disclosure also relates to a method of manufacturing a razor cartridge relates to methods of manufacturing the cutting members and/or the razor cartridges according to the present disclosure (several aspects of the manufacturing methods have been described in the context of the discussion of the cutting members and razor cartridges above).

The present disclosure also relates to the cutting members, razor cartridges, razors, kits and methods of the following aspects:

1. A cutting member comprising:

a base portion configured to couple the cutting member to a razor cartridge being formed of a single sheet of material or multiple fixedly connected sheets of material, the base portion defining two broad surfaces and edges connecting the two broad surfaces, a first cutting edge portion connected to an edge of the base portion and extending at an angle in a first direction, and a second cutting edge portion connected to the edge of the base portion and extending at an angle in a second direction different from the first direction.

2. A razor cartridge comprising, a razor cartridge housing, and one or more cutting members according to aspect 1 arranged between a first longitudinal side and a second longitudinal side of the razor cartridge housing, wherein the first cutting edge portion of each of the cutting members is oriented towards the first longitudinal side and the second cutting edge portion of each of the cutting members is oriented towards the second longitudinal side.

3. The razor cartridge of aspect 2, wherein the base portion of the cutting member is movably arranged within the razor cartridge housing in a direction orthogonal to a shaving plane SH defined by a skin-contacting side of the razor cartridge housing.

4. The razor cartridge according to aspect 2 or aspect 3, wherein each cutting member comprises:

a blade support comprising the base portion, a first blade mounting portion and a second blade mounting portion;

wherein the first cutting edge portion is attached to the first blade mounting portion and wherein the second cutting edge portion is attached to the second blade mounting portion.

5. The razor cartridge according to aspect 2 or aspect 3, wherein each cutting member comprises a first blade support and a second blade support, each blade support comprising a body portion and a blade mounting portion;

wherein the first cutting edge portion is attached to the blade mounting portion of the first blade support and the second cutting edge portion is attached to the blade mounting portion of the second blade support;

wherein the body portions of the first and the second blade supports are attached to one another such that the first cutting edge portion and the second cutting edge portion are oriented away from one another; and wherein the attached body portions of the first blade support form the base portion of the cutting member.

6. The razor cartridge according to any one of aspects 3 to 4, wherein each blade mounting portion comprises one or more protruding tabs extending in the same direction from the base portion of the cutting member for receiving the cutting edge portion, wherein the protruding tabs of the blade mounting portions of a cutting member are arranged in an alternating manner along a longitudinal extension of the base portion.

7. The razor cartridge of aspect 6, wherein each blade mounting portion comprises two or more protruding tabs extending in the same direction from the base portion.

8. The razor cartridge according to any one of aspects 3 to 6, wherein the first and second cutting edge portions are welded to the respective blade mounting portions.

9. The razor cartridge according to aspects 3 to 8, wherein the first cutting edge portion and/or the second cutting edge portion is attached to a respective outer surface of the respective blade mounting portion that, in use, faces the shaving plane.

10. The razor cartridge according to aspects 3 to 8, wherein the first cutting edge portion and/or the second cutting edge portion is attached to a respective inner surface of the respective blade mounting portion that, in use, faces away from the shaving plane.

11. The razor cartridge according to aspect 2, wherein each cutting member comprises a first bent blade and a second bent blade, each bent blade comprising a body portion and one of the first and second cutting edge portions, wherein the body portions of the first and the second bent blades are attached to one another such that the cutting edge portion of the first bent blade and the cutting edge portion of the second bent blade are oriented away from each other, wherein the attached body portions of the first bent blade and the second bent blade form the base portion of the cutting member.

12. The razor cartridge according to any of the previous aspects 2 to 10, wherein the cutting member has a Y-shaped form, wherein the stem of the Y forms the base portion and each branch of the of the Y forms one cutting edge portion.

13. The razor cartridge according to any of the previous aspects, wherein the first cutting edge portion and the base portion define a first internal angle and wherein the second cutting edge and the base portion define a second internal angle, wherein the value of the first internal angle ranges from about 90° to lower than 180° and the value of the second internal angle ranges from about 90° to lower than 180°.

14. The razor cartridge according to aspect 13, wherein the value of the first internal angle ranges from about 90° to about 135° and the value of the second internal angle ranges from about 90° to about 135°.

15. The razor cartridge according to aspect 13, wherein the value of the first internal angle ranges from about 105° to about 130° and the value of the second internal angle ranges from about 105° to about 130°.

16. The razor cartridge according to aspects 13 to 15, wherein the values of the first internal angle and the second internal angle are equal.

17. The razor cartridge according to aspects 13 to 15, wherein the values of the first internal angle and the second internal angle are different.

18. The razor cartridge according to any of the previous aspects, wherein the first cutting edge portion and the second cutting edge portion respectively comprise a cutting edge.

19. The razor cartridge according to any of the previous aspects wherein two or more cutting members are disposed to define inter-blade spans between first cutting edges of the first cutting edge portions, and between second cutting edges of the second cutting edge portions, wherein a first dimension D1 of the cutting member corresponds to an orthogonal projection of the length of the first cutting edge portion on the shaving plane and a second dimension D2 of the cutting member corresponds to an orthogonal projection of the length of the second cutting edge portion on the shaving plane, and wherein the spans at least comprise the longest of D1 or D2 such that the cutting edge portions facing each other do not overlap.

20. The razor cartridge according to aspect 19, wherein the first dimension D1 and the second dimension D2 are equal.

21. The razor cartridge according to aspect 19, wherein the first dimension D1 and the second dimension D2 are different.

22. The razor cartridge according to any one of the preceding aspects, wherein the first direction and the second direction have at least an anti-parallel component 23. A shaving razor assembly comprising:

a razor handle; and a razor cartridge according to any one of aspects 2 to 22.

24. The shaving razor assembly of aspect 23, wherein the razor cartridge is releasably attached to the razor handle via a pivotable connection.

25. The shaving razor assembly of aspect 23, wherein the razor cartridge is releasably attached to the razor handle via a non-pivotable connection.

26. The shaving razor assembly of aspect 23, wherein the razor cartridge integrally formed with the razor handle via a pivotable connection.

27. The shaving razor assembly of aspect 23, wherein the razor cartridge integrally formed with the razor handle via a non-pivotable connection.

28. A kit of parts comprising:

a razor handle; and a razor cartridge holder comprising a plurality of razor cartridges according to any one of aspects 2 to 22.

29. A method of manufacturing a cutting member or a razor cartridge as defined in any one of aspects 1 to 22.

The invention claimed is:

1. A cutting member comprising:

a base portion configured to couple the cutting member to a razor cartridge, wherein the base portion is formed of multiple fixedly connected sheets of material, the base portion defined by two body portions connected to each other, a first cutting blade extending at an angle in a first direction, a second cutting blade extending at an angle in a second direction different from the first direction, wherein the cutting member has a Y-shaped form, wherein a stem of the Y-shaped form forms the base portion, and wherein each branch of the Y-shaped form forms a respective one of the first cutting blade and the second cutting blade.

2. A razor cartridge comprising:

a razor cartridge housing, and one or more cutting members according to claim 1 arranged between a first longitudinal side and a second longitudinal side of the razor cartridge housing, wherein the first cutting blade of each of the one or more cutting members is oriented towards the first longitudinal side and the second cutting blade of each of the one or more cutting members is oriented towards the second longitudinal side.

3. The razor cartridge of claim 2, wherein the one or more cutting members comprise two or more cutting members.

4. The razor cartridge according to claim 3, wherein the first cutting blade and/or the second cutting blade is attached to a respective outer surface of a respective blade mounting portion of the one or more cutting members that, in use, faces a shaving plane, or wherein the first cutting blade and/or the second cutting blade is attached to a respective inner surface of the respective blade mounting portion of the one or more cutting members that, in use, faces away from the shaving plane.

5. The razor cartridge accordingly to claim 3, wherein the first cutting blades and the second cutting blades of the two or more cutting members do not overlap.

6. The razor cartridge of claim 2, wherein the base portion of each of the one or more cutting members is movably arranged within the razor cartridge housing in a direction orthogonal to a shaving plane defined by a skin-contacting side of the razor cartridge housing.

7. The razor cartridge according to claim 2, wherein each of the one or more cutting members comprises:

a blade support comprising the base portion, a first blade mounting portion and a second blade mounting portion;

wherein the first cutting blade is attached to the first blade mounting portion and wherein the second cutting blade is attached to the second blade mounting portion.

8. The razor cartridge according to claim 7, wherein the first cutting blade and the second cutting blade are welded to their respective blade mounting portions.

9. The razor cartridge according to claim 2, wherein each of the one or more cutting members comprises:

a first blade support and a second blade support, each of the first blade support and the second blade support comprising one of the two body portions and a blade mounting portion;

wherein the first cutting blade is attached to the blade mounting portion of the first blade support and the second cutting blade is attached to the blade mounting portion of the second blade support;

wherein the body portions of the first blade support and the second blade support are attached to each other such that the first cutting blade and the second cutting blade are oriented away from each other; and wherein the attached body portions of the first blade support and the second blade support form the base portion of each of the one or more cutting members.

10. The razor cartridge according to claim 2, wherein each cutting member comprises a first bent blade and a second bent blade, each bent blade comprising one of the two body portions and one of the first cutting blade and the second cutting blade, wherein the body portions of the first bent blade and the second bent blade are attached to each other such that the cutting blade of the first bent blade and the cutting blade of the second bent blade are oriented away from each other, wherein the attached body portions of the first bent blade and the second bent blade form the base portion of the cutting member.

11. The razor cartridge according to claim 2, wherein the first cutting blade and the base portion define a first internal angle and wherein the second cutting blade and the base portion define a second internal angle, wherein a value of the first internal angle ranges from 90° to lower than 180° and a value of the second internal angle ranges from 90° to lower than 180°.

12. The razor cartridge according to claim 11, wherein the value of the first internal angle ranges from 90° to 135° and the value of the second internal angle ranges from 90° to 135°.

13. The razor cartridge according to claim 2, wherein the first cutting blade and the second cutting blade each comprises a cutting edge.

14. A shaving razor assembly comprising:

a razor handle; and a razor cartridge according to claim 2.

15. A razor cartridge comprising:

a razor cartridge housing, and one or more cutting members including:

a base portion configured to couple the one or more cutting members to the razor cartridge housing, wherein the base portion is formed of multiple fixedly connected sheets of material, the base portion defined by two body portions connected to each other, a first cutting blade extending at an angle in a first direction, and a second cutting blade extending at an angle in a second direction different from the first direction;

wherein the one or more cutting members are arranged between a first longitudinal side and a second longitudinal side of the razor cartridge housing, wherein the first cutting blade of each of the one or more cutting members is oriented towards the first longitudinal side and the second cutting blade of each of the one or more cutting members is oriented towards the second longitudinal side, wherein each of the one or more cutting members comprises:

a first blade support and a second blade support, each of the first blade support and the second blade support comprising one of the two body portions and a blade mounting portion;

wherein the first cutting blade is attached to the blade mounting portion of the first blade support and the second cutting blade is attached to the blade mounting portion of the second blade support, wherein the body portions of the first blade support and the second blade support are attached to each other such that the first cutting blade and the second cutting blade are oriented away from each other, and wherein the attached body portions of the first blade support and the second blade support form the base portion of each of the one or more cutting members.

16. The razor cartridge of claim 15, wherein the one or more cutting members comprise two or more cutting members.

17. The razor cartridge according to claim 16, wherein each of the cutting members comprise a cutting edge.

18. A shaving razor assembly comprising:

a razor handle; and a razor cartridge according to claim 15.

* * * * *